(12) United States Patent
Faulkner

(10) Patent No.: US 12,477,016 B2
(45) Date of Patent: Nov. 18, 2025

(54) AUTOMATION OF VISUAL INDICATORS FOR DISTINGUISHING ACTIVE SPEAKERS OF USERS DISPLAYED AS THREE-DIMENSIONAL REPRESENTATIONS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/827,588

(22) Filed: May 27, 2022

(65) Prior Publication Data

US 2023/0388355 A1    Nov. 30, 2023

(51) Int. Cl.
*H04L 65/403* (2022.01)
*G06F 3/04815* (2022.01)
(Continued)

(52) U.S. Cl.
CPC ...... *H04L 65/1083* (2013.01); *G06F 3/04815* (2013.01); *G10L 25/78* (2013.01); *H04L 65/403* (2013.01); *G06F 2203/04803* (2013.01)

(58) Field of Classification Search
CPC ............ H04L 65/1083; H04L 65/403; G06F 3/04815; G06F 2203/04803; G10L 25/78
See application file for complete search history.

(56) References Cited

U.S. PATENT DOCUMENTS 7,006,616 B1    2/2006  Christofferson et al.
9,819,877 B1 *  11/2017 Faulkner ............... H04N 7/147
(Continued)

FOREIGN PATENT DOCUMENTS

WO    2021257868 A1    12/2021
WO    2022066642 A1    3/2022

OTHER PUBLICATIONS

"Non Final Office Action Issued in U.S. Appl. No. 17/824,869", Mailed Date: Jul. 25, 2023, 12 Pages.
(Continued)

*Primary Examiner* — Cesar B Paula
*Assistant Examiner* — Zelalem Shalu
(74) *Attorney, Agent, or Firm* — Scott Y. Shigeta; Newport IP, LLC

(57) ABSTRACT

The disclosed techniques provide systems that automate visual indicators to show active speakers of a communication session who are displayed as 3D representations. Some participants of a communication session can be displayed in a user interface using 3D representations, e.g., avatars, that are each positioned within a 3D environment. The user interface may also include and number of renderings of 2D images of other participants displayed in a gallery, e.g., a display region that is designated for active speakers. When a user who is displayed as a 3D representation starts to speak, the system can detect the speaker's activity via a detection of an audio signal from the user's device. In response to the detection, the system can then automatically add a complementary image of the user to the gallery. The complementary image can help viewers navigate through complex user interface arrangements that display a large number of avatars.

20 Claims, 14 Drawing Sheets

(51) Int. Cl.
  *G10L 25/78* (2013.01)
  *H04L 65/1083* (2022.01)

(56) References Cited

U.S. PATENT DOCUMENTS

| | | | |
|---|---|---|---|
| 10,592,013 | B2 | 3/2020 | Mandel-iaia et al. |
| 11,682,164 | B1 | 6/2023 | Krol et al. |
| 11,689,696 | B2 * | 6/2023 | Lin .................. H04N 7/157 348/14.03 |
| 2010/0153497 | A1 | 6/2010 | Sylvain et al. |
| 2014/0163982 | A1 | 6/2014 | Daborn et al. |
| 2015/0304366 | A1 * | 10/2015 | Bader-Natal ........ H04L 65/1096 348/14.03 |
| 2017/0053542 | A1 | 2/2017 | Wilson |
| 2017/0372505 | A1 | 12/2017 | Bhat |
| 2018/0278891 | A1 * | 9/2018 | Pan .................. H04N 21/4316 |
| 2019/0332189 | A1 | 10/2019 | Mandel-iaia et al. |
| 2020/0184701 | A1 | 6/2020 | Chand |
| 2021/0027511 | A1 | 1/2021 | Shang |
| 2021/0349604 | A1 | 11/2021 | Van Wie |
| 2021/0392175 | A1 | 12/2021 | Gronau |
| 2022/0066620 | A1 | 3/2022 | Anderson et al. |
| 2022/0086203 | A1 | 3/2022 | Morris et al. |
| 2022/0124286 | A1 | 4/2022 | Punwani |
| 2022/0214743 | A1 | 7/2022 | Dascola et al. |
| 2022/0374136 | A1 * | 11/2022 | Chang ................ G06F 3/04845 |
| 2022/0393997 | A1 | 12/2022 | Hong |
| 2023/0135075 | A1 * | 5/2023 | Springer ................ G06N 20/10 348/14.03 |
| 2023/0164298 | A1 | 5/2023 | Khot |
| 2023/0206531 | A1 | 6/2023 | Agura et al. |
| 2023/0222721 | A1 | 7/2023 | Chen |
| 2023/0386145 | A1 | 11/2023 | Faulkner |
| 2023/0388357 | A1 | 11/2023 | Faulkner |

OTHER PUBLICATIONS

"International Search Report and Written Opinion Issued in PCT Application No. PCT/US23/018396", Mailed Date: Jul. 14, 2023, 11 Pages.

"International Search Report and Written Opinion Issued in PCT Application No. PCT/US23/019181", Mailed Date: Aug. 2, 2023, 11 Pages.

"International Search Report and Written Opinion Issued in PCT Application No. PCT/US23/018798", Mailed Date: Aug. 10, 2023, 15 Pages.

Non-Final Office Action mailed on Apr. 8, 2024, in U.S. Appl. No. 17/824,869, 13 pages.

Tim Fisher, "How to Create a Loomie 3D Avatar for All Your Zoom Meetings", Beat Zoom fatigue with an animated version of you—Lifewise Tech for Humans, Retrieved from: https://www.lifewire.com/create-3d-avatar-loomie-5075012#:-:text=Otherwise%2C%20choose%20the%20settings%20button,avatar%20in%20place%20of%20you, Feb. 15, 2021, 10 pages.

"Non Final Office Action Issued in U.S. Appl. No. 17/827,618", Mailed Date: Oct. 5, 2023, 23 Pages.

Notice of Allowance mailed on Aug. 26, 2024, in U.S. Appl. No. 17/824,869, 07 pages.

Final Office Action mailed on May 30, 2024, in U.S. Appl. No. 17/827,618, 30 pages.

Non-Final Office Action mailed on Sep. 9, 2024, in U.S. Appl. No. 17/827,618, 33 pages.

Notice of Allowance mailed on Oct. 3, 2024, in U.S. Appl. No. 17/824,869, 7 pages.

Notice of Allowance mailed on Apr. 4, 2025, in U.S. Appl. No. 17/827,618, 14 Pages.

U.S. Appl. No. 17/824,869, filed May 25, 2022.
U.S. Appl. No. 17/827,618, filed May 27, 2022.

\* cited by examiner

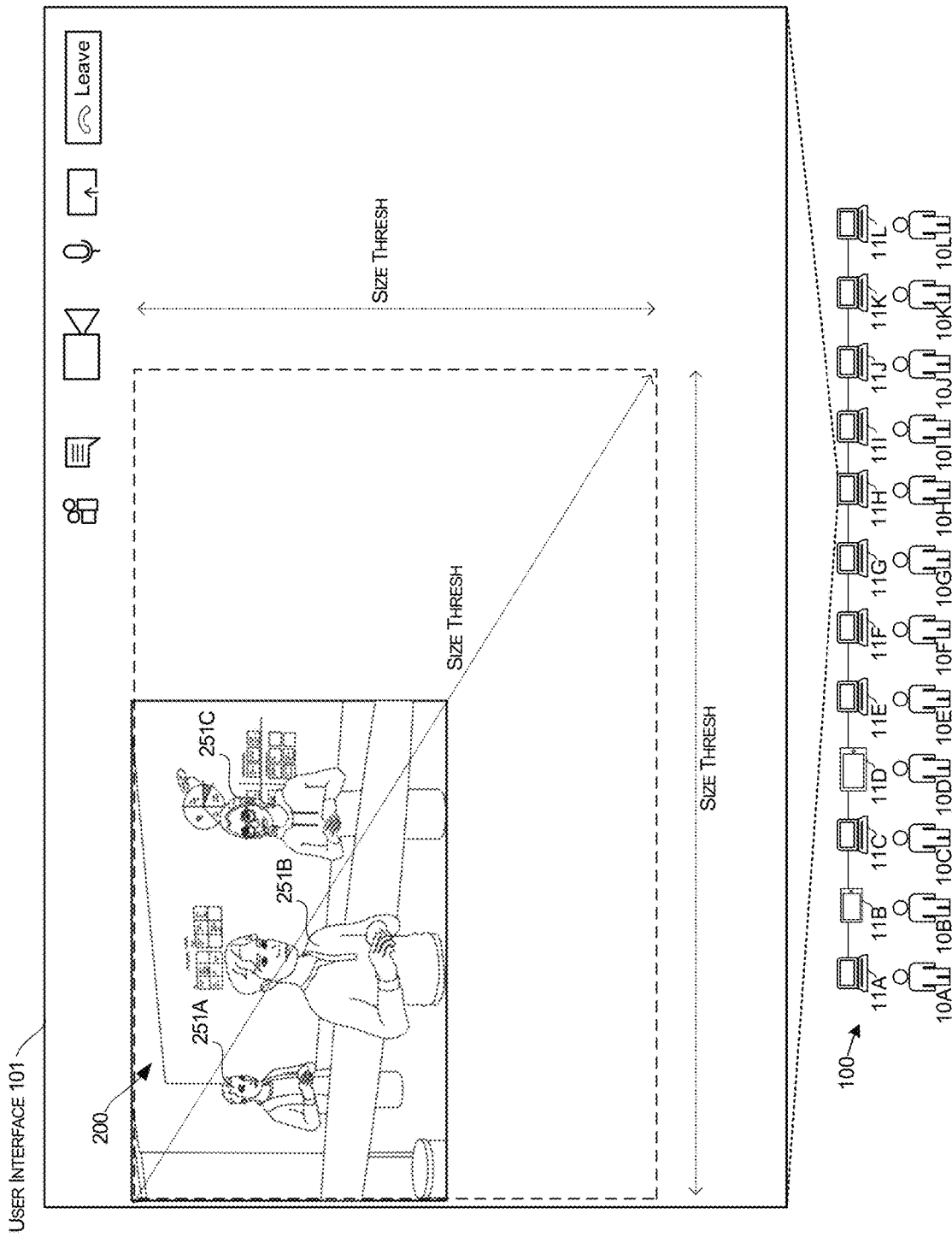

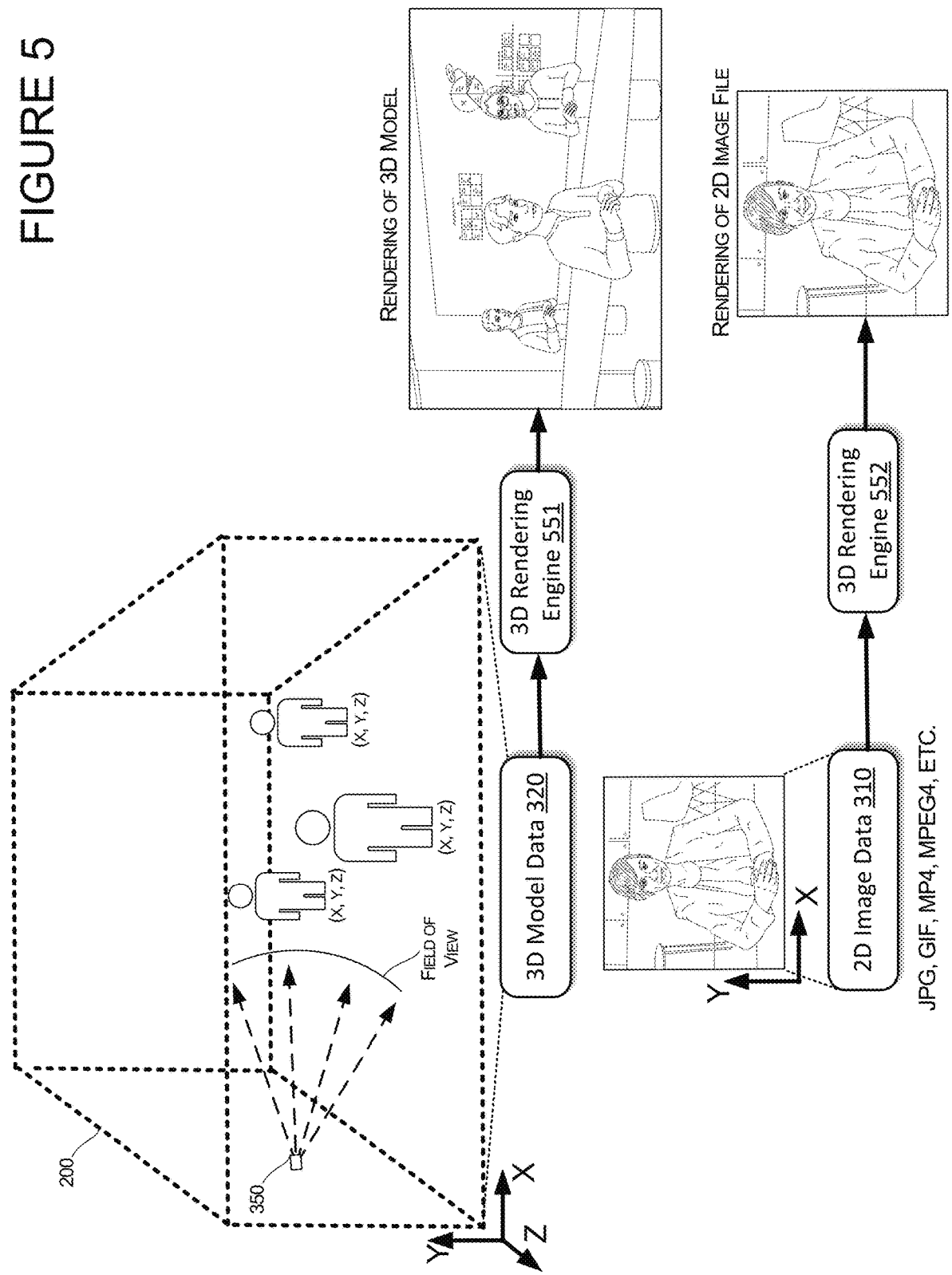

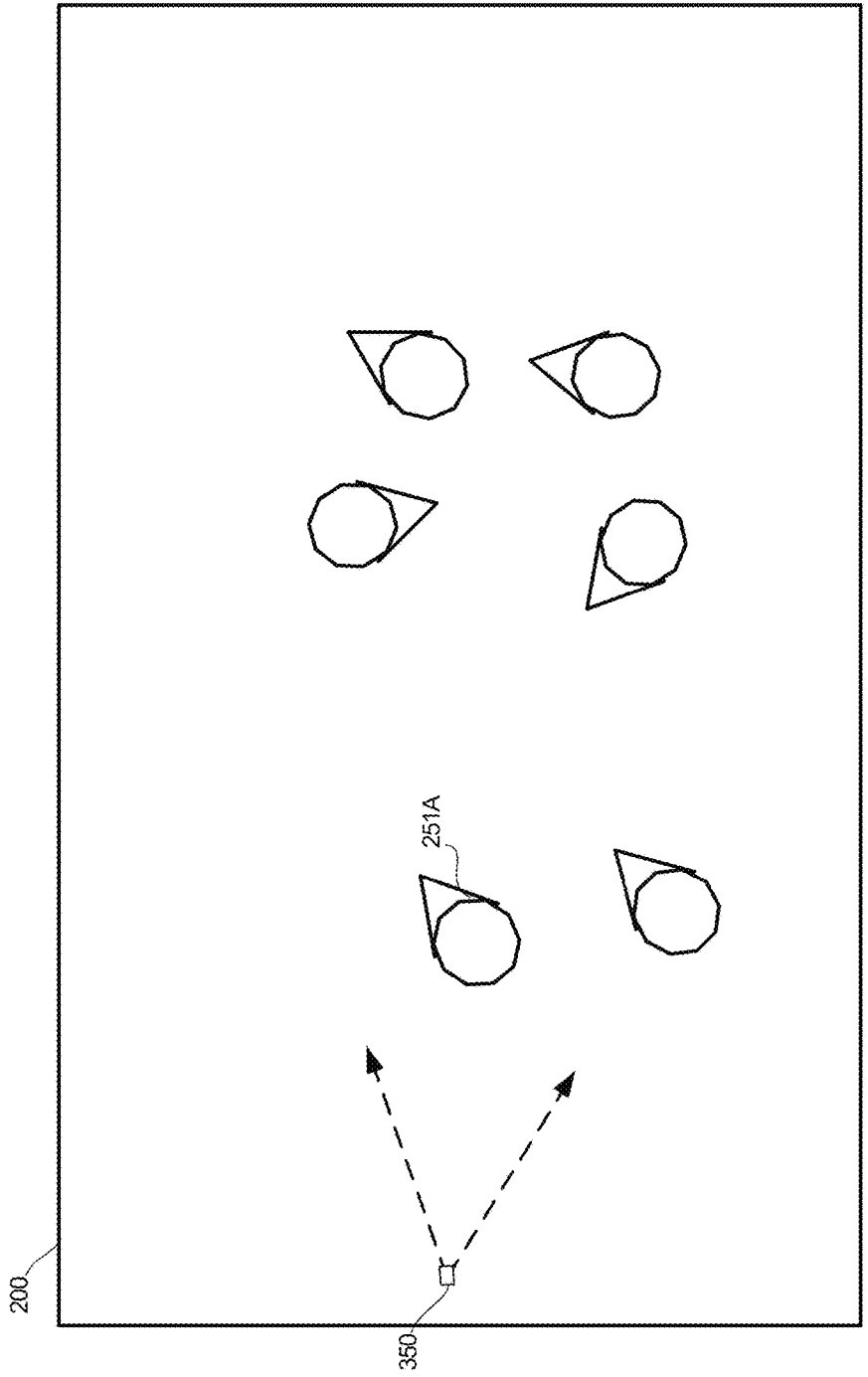

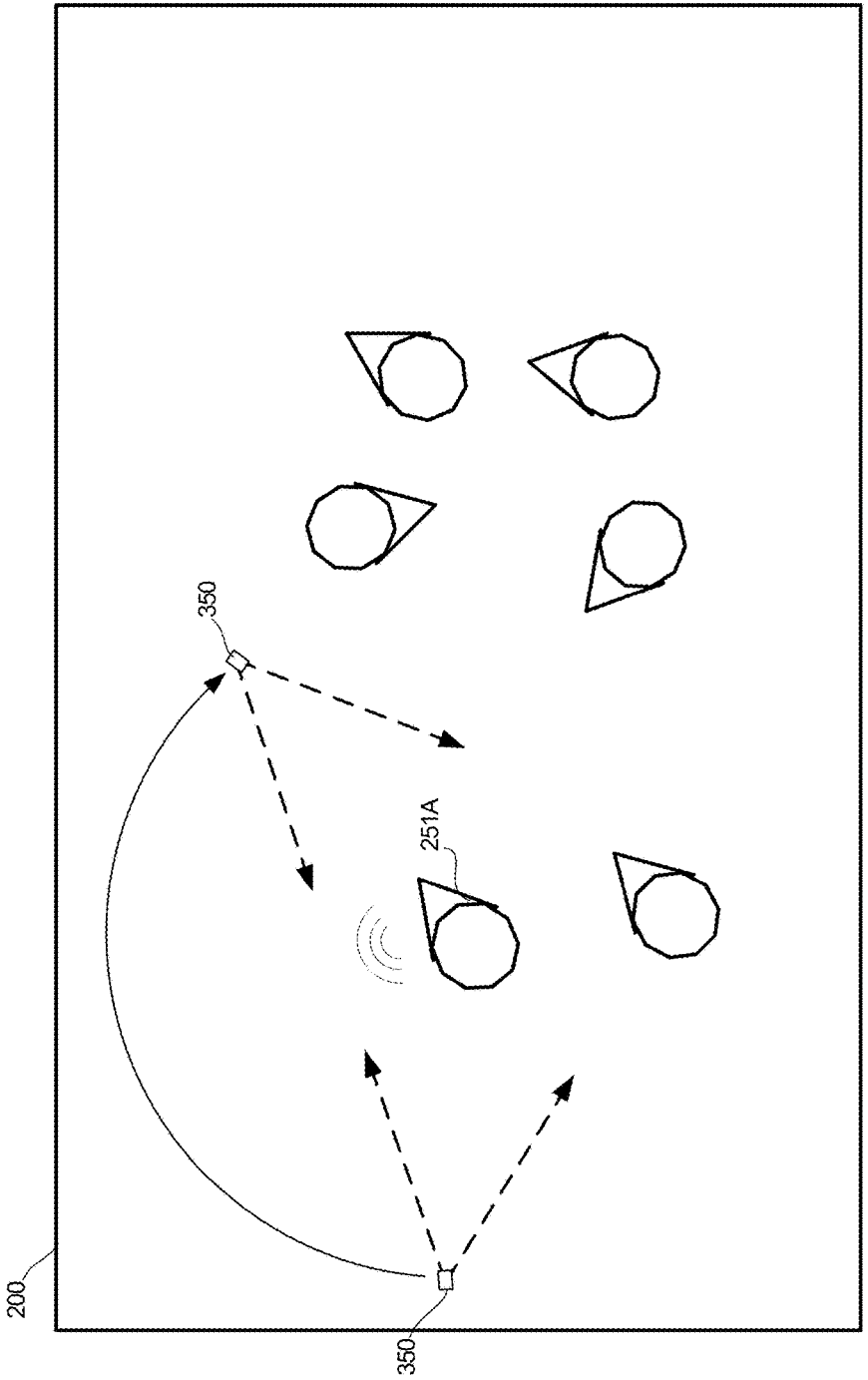

AUTOMATION OF VISUAL INDICATORS FOR DISTINGUISHING ACTIVE SPEAKERS OF USERS DISPLAYED AS THREE-DIMENSIONAL REPRESENTATIONS

BACKGROUND

The use of meta-verse environments for on-line meeting applications is becoming ubiquitous. Participants of online meetings now meet in three-dimensional (3D) virtual environments and share content within those virtual environments. Despite a number of benefits over other forms of collaboration, the use of 3D environments for sharing content can raise a number of drawbacks.

One of the main issues with using meta-verse environments for on-line meeting applications is that there may be scenarios where the participants of a meeting may have trouble identifying relevant user activity. Some systems supporting 3D environments can allow many users to participate. Some 3D environments allow hundreds of users. For certain types of events, such as a meeting, it may be hard for a user to identify specific conversations and specific people engaging in activity that is of interest. This issue may be exacerbated when user interface arrangements include a combination of 2D and 3D renderings. In such arrangements, the display of a 3D environment may only take a portion of a display screen, thus reducing the size of the rendering of the 3D environment and making it more difficult to identify relevant user activity within the display of the 3D environment. For instance, if a rendering of the 3D environment only utilizes half of a display area, while the other half of the display area is used for other types of renderings, it may be difficult for a viewer to identify certain types of activity in the display of the 3D environment. Specifically, it may be difficult for a viewer to identify a person who is talking.

These issues can cause a number of inefficiencies as it may require a user to carefully scan a user interface for relevant activity. This can be a difficult when the user is looking at a rendering of a 3D environment with lots of displayed avatars or a rendering that only takes a small portion of a display screen. In addition, when it comes to renderings of 3D environments, navigation tools are not always optimized to allow users to search for relevant activity.

These shortcomings can lead to ineffective interactions between a computing device and a user, particularly during a communication session. In addition, the above-described shortcomings of existing systems can lead to a loss in user engagement. Computing devices that do not promote user engagement, or worse, contribute to a loss of user engagement and subpar interactions, can lead to production loss and inefficiencies with respect to a number computing resources. For instance, when a user becomes fatigued or disengaged, that user may need to refer to other resources, such as documents or use other forms of communication, e.g., texts or chat messages, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience of communication systems more engaging and more like, or better than, an in-person meeting.

SUMMARY

The techniques disclosed herein provide systems that automatically generate visual indicators to show active speakers of a communication session who are displayed as 3D representations. Some participants of a communication session can be displayed in a user interface using 3D representations, e.g., avatars, that are each positioned within a 3D environment. The user interface may also include a number of renderings of 2D images of other participants displayed in a gallery, e.g., a grid or other pattern of 2D images. When an operation refers to a display in "gallery mode," the system displays a user interface that includes a number of renderings of 2D renderings of 2D images of participants in a gallery arrangement, such as a grid or other pattern. Renderings in a 2D format include renderings of 2D image file which may include a still image or a live stream of 2D images. A user interface displayed in gallery mode can include video streams or images from participants having 2D devices, such as a Personal Computer (PC) having a 2D display screen and a single camera directed toward the user. For illustrative purposes, a gallery is a display region that is designated for the display of videos or images of active speakers. When a user, who is displayed as a 3D representation, start to speak, the system can detect the speaker's activity via a detection of an audio signal from the user's device. The speaker's activity can also be detected in other ways. For instance, in some configurations, the speaker can be detected by analysis of the user's avatar. If the avatar movement indicates that speaker is talking, the system can then automatically add a complementary image of the user to a gallery in the user interface. The gallery is a display region that is designated for active speakers. This addition of the user's complementary image can include a live stream video of the user, an animation of the user, or another avatar of the user. The complementary image can be displayed concurrently with the 3D representation of the user that is positioned within a 3D environment.

The techniques disclosure in provide a number of technical benefits. For instance, by providing systems that automate visual indicators to show active speakers, particularly in a communication system, users can more effectively exchange information and gain a better understanding of the broader context of a meeting. Also, by viewing an actual video stream of an active speaker, instead of relying on a displayed avatar having a reduced size, users can readily benefit from viewing subtle gestures and body language. This helps mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4A illustrates a scenario where a size threshold of a rendering of a 3D environment can be used to change permissions to allow the display of a visual indicator of an active speaker.

FIG. 5 illustrates technical details on the 2D and 3D renderings disclosed herein.

FIG. 6A illustrates a scenario where user representations are positioned within a 3D environment relative to a virtual camera.

FIG. 6B illustrates how the system can move the virtual camera to a new position and orientation in response to the detection of an active speaker.

DETAILED DESCRIPTION

Figure 1A:
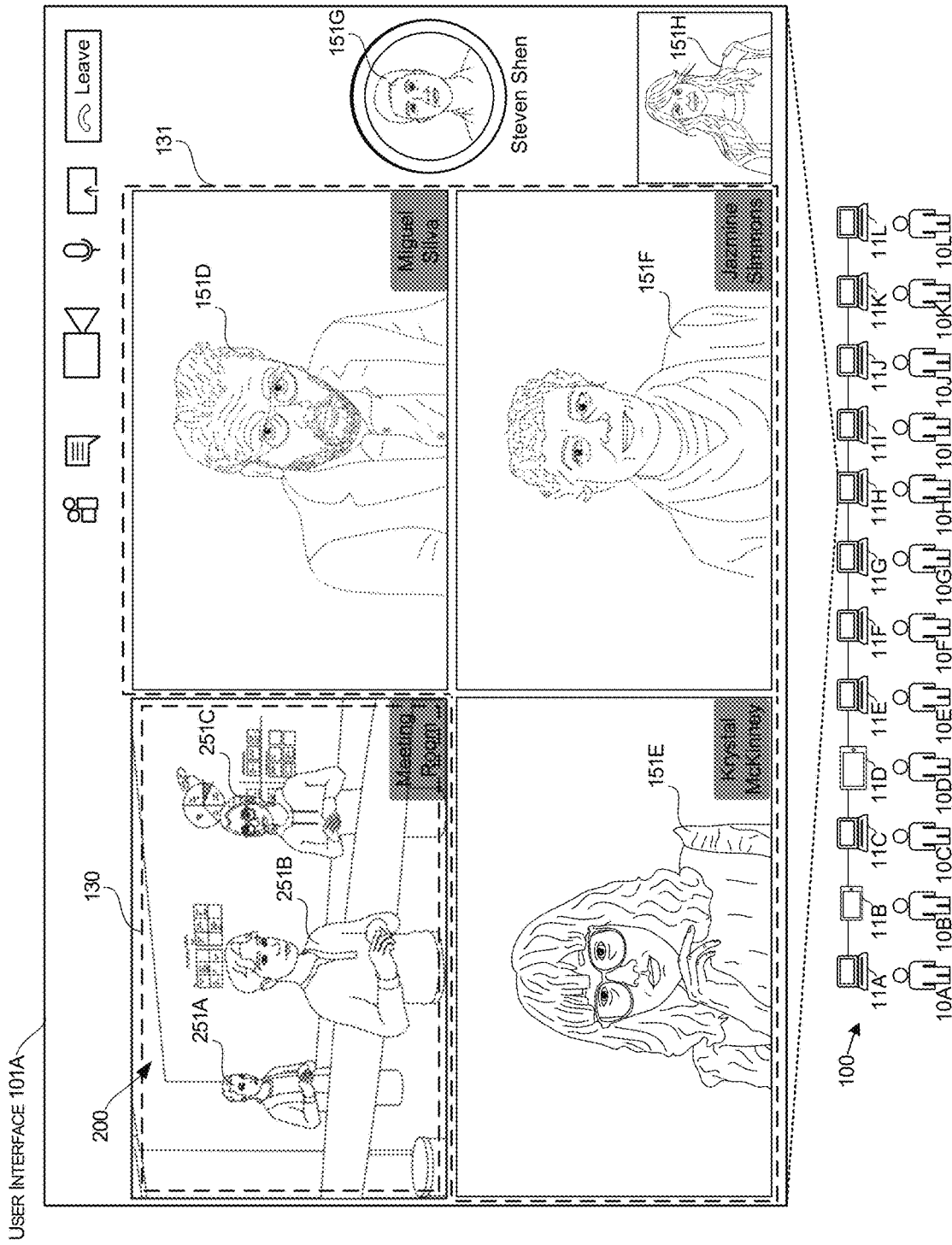
FIG. 1A illustrates a first user interface arrangement showing a plurality of users, where a first set of users are displayed as 3D representations and a second set of users are displayed as 2D images positioned with a designated region reserved for active speakers.
Figure 1B:
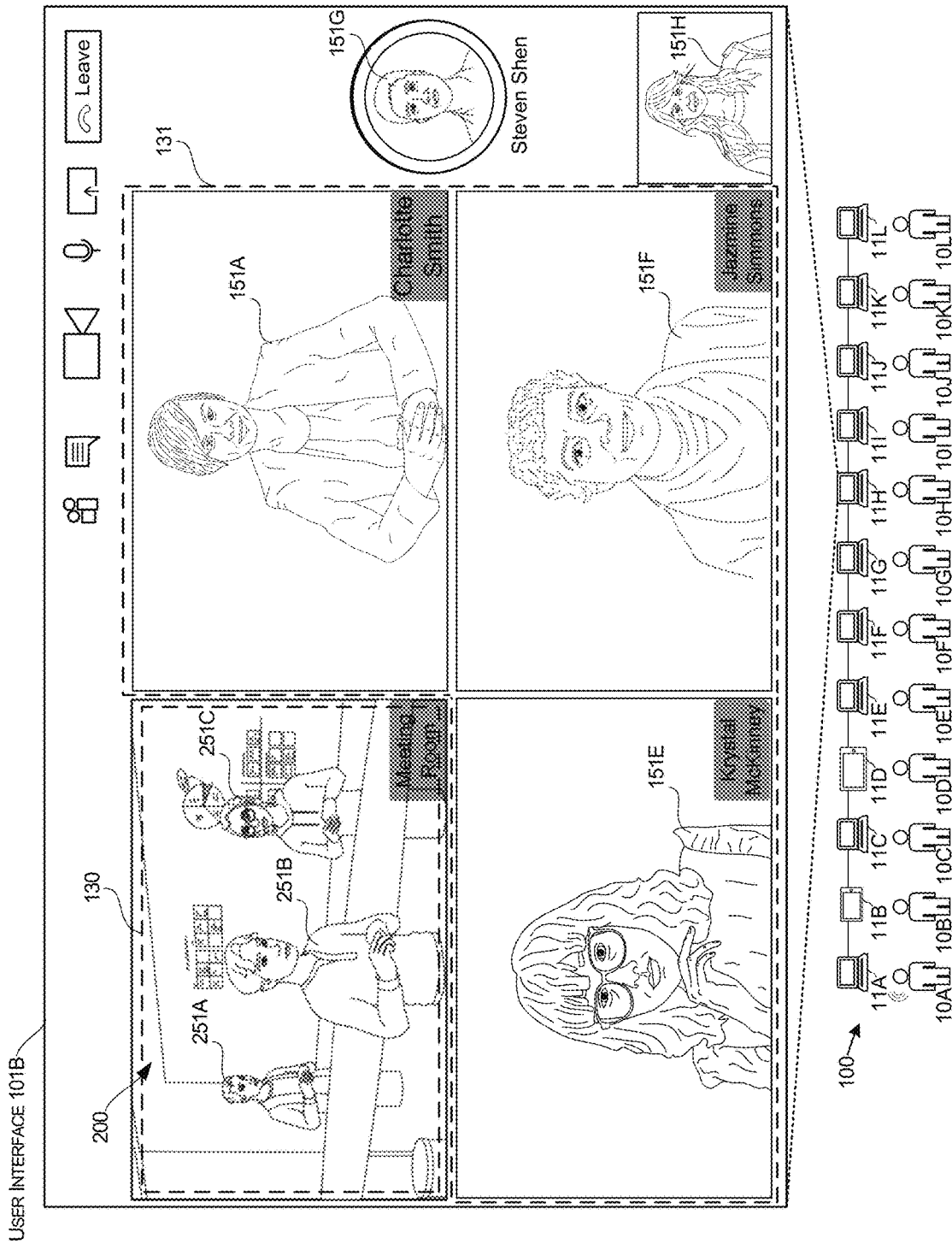
FIG. 1B illustrates a second user interface arrangement that provides a visual indicator to bring user focus to an active speaker of the first set of users displayed as 3D representations, where the visual indicator is a supplemental image of the active speaker displayed in a designated region positioned within a grid of 2D images.

FIGS. 1A and 1B illustrate an example of a UI transition that changes a viewing perspective of a 3D environment to bring focus to relevant activity for a user participating in a communication session. The communication session can be managed by a system 100 comprising a number of computers 11 each corresponding to a number of users 10. In this example, the First User 10A, Reta Taylor, is associated with the first computer 11A, the Second User 10B, Miguel Silva, is associated with the second computer 11B, the Third User 10C, Bryan Wright, is associated with the third computer 11C, the Fourth User 10D, MJ Price, is associated with the fourth computer 11D, the Fifth User 10E, Bruno Zhaos, is associated with the fifth computer 11E, the Sixth User 10F, Serena Davis, is associated with the sixth computer 11F, the Seventh User 10G, Krystal McKinney, is associated with the seventh computer 11G, the Eighth User 10H, Jessica Kline, is associated with the eighth computer 11H, the Ninth User 10I, Kat Larsson, is associated with the ninth computer 11I, and the tenth User 10J, Traci Isaac, is associated with the tenth computer 11J. These users can also be respectively referred to as "User A," User B," etc. Other users, e.g., User K and User L, are also participants of the communication session.

Each user can be displayed in a user interface as a two-dimensional (2D) image 151 or each user can be displayed in a user interface as a three-dimensional (3D) representation 251. The 2D image 151 can be a static image or a video stream generated by a camera directed to a user. The 3D representation 251 may be a static model or a dynamic model that is animated with real-time motion that is responsive to a user input such as a user talking or a user input to a keyboard. The computers can be in the form of desktop computers, head-mounted display units, tablets, mobile phones, etc.

The system can generate a user interface showing aspects of the communication session to each user participating in a communication session. In this example, a first user interface arrangement 101A is initially displayed to one or more users. The first user interface arrangement includes a number of renderings of each user 10 in two regions: a first region 130 that is designated for a rendering of 3D representations of users positioned within a 3D environment 200 and a second region 131 that is designated for active speakers. In this embodiment, the second region 131 designated for active speakers is in association with a grid of 2D renderings of images that can be static images or dynamic video streams.

The system can select individual renderings of users for the second region 131 who are actively speaking within a communication session. The system can use one or more thresholds or criteria for selecting individual users to be displayed within the second region 131 that is designated for active speakers. For instance, when the system detects that a user produces an audio signal from a microphone, the system can display a rendering of that user within the second region 131. In another example, the system can detect keyboard inputs or other forms of communication that can control the rendering of an avatar. If an input, such as a keyboard input for a chat, controls an avatar to give the appearance that the avatar is speaking, the system can display a second rendering of that user within the second region 131. The system can use criteria such as a rate of speech, a threshold number of words or characters, or a threshold volume level to select a user to determine if an input qualifies as a triggering input that invokes the UI transitions described herein.

For instance, if a user provides a number of keyboard or touch screen inputs to control an avatar or to provide text that may be converted to speech, and the keyboard inputs include a threshold number of words or a threshold speech rate, the system can display an image, or a supplemental image, of that user within the second region 131. The system can also analyze an audio signal to determine a rate of speech, or determine if a user has provided a threshold number of words in a speech input. If the rate of speech or a number of words spoken by a user meets one or more criteria or exceeds one or more thresholds, the system can display a rendering of that user within the second region 131. Users who have speech activity that does not meet one or more criteria or does not exceed one or more thresholds, the system does not display their image in the second region 131.

The second region 131 can also have a predetermined limit of users that can be displayed. In such embodiments, users that are engaging in speech activity are ranked according to their activity. For instance, users that are speaking in a communication session may be ranked in a speaker queue based on a speech rate, a volume, the use of select words or terms, etc. The highest rank speakers, up to the predetermined limit, can be displayed within the second region 131. Once the input of those displayed speakers does not meet the criteria, the image of that active speaker may be removed.

The first user interface arrangement 101A can include two-dimensional (2D) images 151 of some users, which can include a still image or live video feed of a user. The first user interface arrangement 101A can also include renderings of the 3D representations 251, which can include avatars positioned within a 3D virtual environment 200. In this particular example, the first user interface arrangement 101A includes a rendering of a 3D representative 251A of the first user 10A, a rendering of a 3D representative 251B of the second user 10B, and a rendering of a 3D representative 251C of the third user 10C.

The first user interface arrangement 101A also includes a rendering of a 2D image 151D of the fourth user 10D, a rendering of a 2D image 151E of the fifth user 10E, a rendering of a 2D image 151F of the sixth user 10F, a rendering of a 2D image 151G of the seventh user 10G, and a rendering of a 2D image 151H of the eighth user 10H. For illustrative purposes, this first user interface arrangement 101A is displayed on the eighth computer of the eighth user 10H. Thus, the rendering of a 2D image 151H of the eighth user 10H is a display of the local user e.g., a "me" video.

While displaying the first user interface arrangement 101A, the system monitors the activity of the users who are displayed within a 3D environment. To preserve computing resources, in some configurations, the system can limit the monitoring activity to the audio streams of the users who are displayed as 3D representations 251 in the 3D environment. This allows the system to only run the voice analysis on the streams of certain users. In the example of FIG. 1A, that would include the audio streams of the first user, the second user, and the third user. The system can determine if one of the audio streams meets one of our criteria as described herein. For instance, if the first user 10A who was represented by the 3D representation 251A starts to speak at a threshold rate and or a threshold volume, the system may determine that the first user is an active speaker of the users having a 3D representation displayed in a 3D environment.

In response to determining that a user, who has a 3D representation displayed in a 3D environment, has a speech input that meets one or more criteria, the system executes a transition from the first user interface arrangement 101A of FIG. 1A to the second user interface arrangement 101B of FIG. 1B. As shown, in the transition, the system adds a second rendering of an image or representation of the active speaker in the second user interface arrangement 101B.

In some embodiments, the second image of the active speaker is displayed within the second region 131 that is reserved for active speakers. In continuing the example described above, when the first user 10A who is displayed as a first 3D representation 251A provides a speech input that meets one or more criteria, as shown in FIG. 1B, the system displays a second rendering of a 2D image 151A of the first user 10A. In this example, the 2D image of the first user includes a video stream generated by a camera of the first computing device that is associated with the first user 10A. The 2D image 151A of the first user 10A is positioned within the second region 131 that is reserved for active speakers. In this embodiment, the second region 131 that is reserved for active speakers is in a grid format where each section of the grid shows video renderings of participants. This region can be limited to a predetermined number of participants as described herein.

The second user interface arrangement 101B is also configured with the 2D image 151A of the first user 10A such that it is concurrently displayed with the rendering of the 3D representation 251A of the first user 10A. In some embodiments, the rendering of the 3D representation 251A of the first user 10A can be maintained such that the first display region 130 shows the same viewing perspective of the 3D environment 200 throughout the transition.

The second rendering of an image or representation of the active speaker, also referred to herein as a "supplemental image" or a "second image," can be removed based on one or more factors. In some embodiments, the supplemental image can displayed for a predetermined period of time. After the predetermined period of time, the supplemental image, e.g., the 2D image 151A of the first user 10A, can be removed and replaced with another active speaker in a speaker queue. In some embodiments, the supplemental image can displayed until one or more criteria of the speech input is no longer met. For instance, if the one or more criteria of the speech input includes a rate of speech, and a second image of a user that provides that speech input is displayed within the second region 131 in response to a speech input that meets or exceeds that rate of speech, the system can remove the second image of that user once that user stop speaking for a predetermined period of time.

In another example, if a second image, e.g., image 151A of FIG. 1B, of a user that provides a speech input is displayed within the second region 131 in response to a speech input that meets one or more criteria, the system can remove the second image of that user once that user stop speaking, or their speech input no longer meets the one or more criteria. In other embodiments, the system can remove the second image of that user once that user stop speaking for a predetermined period of time. The system can remove the second image of that user based on other factors. For instance, if other users speak at a louder volume than a user who is displayed in the second region, images of those other users may replace the second image of the user. These examples are provided for illustrative purposes and are not to be construed as limiting. It can be appreciated that any type of predetermined input metric related to any quantity of words, quantity of sentences, quantity of phrases, or any rate of input can be used to determine when a second image of a user is to be displayed and/or removed.

Figure 2A:
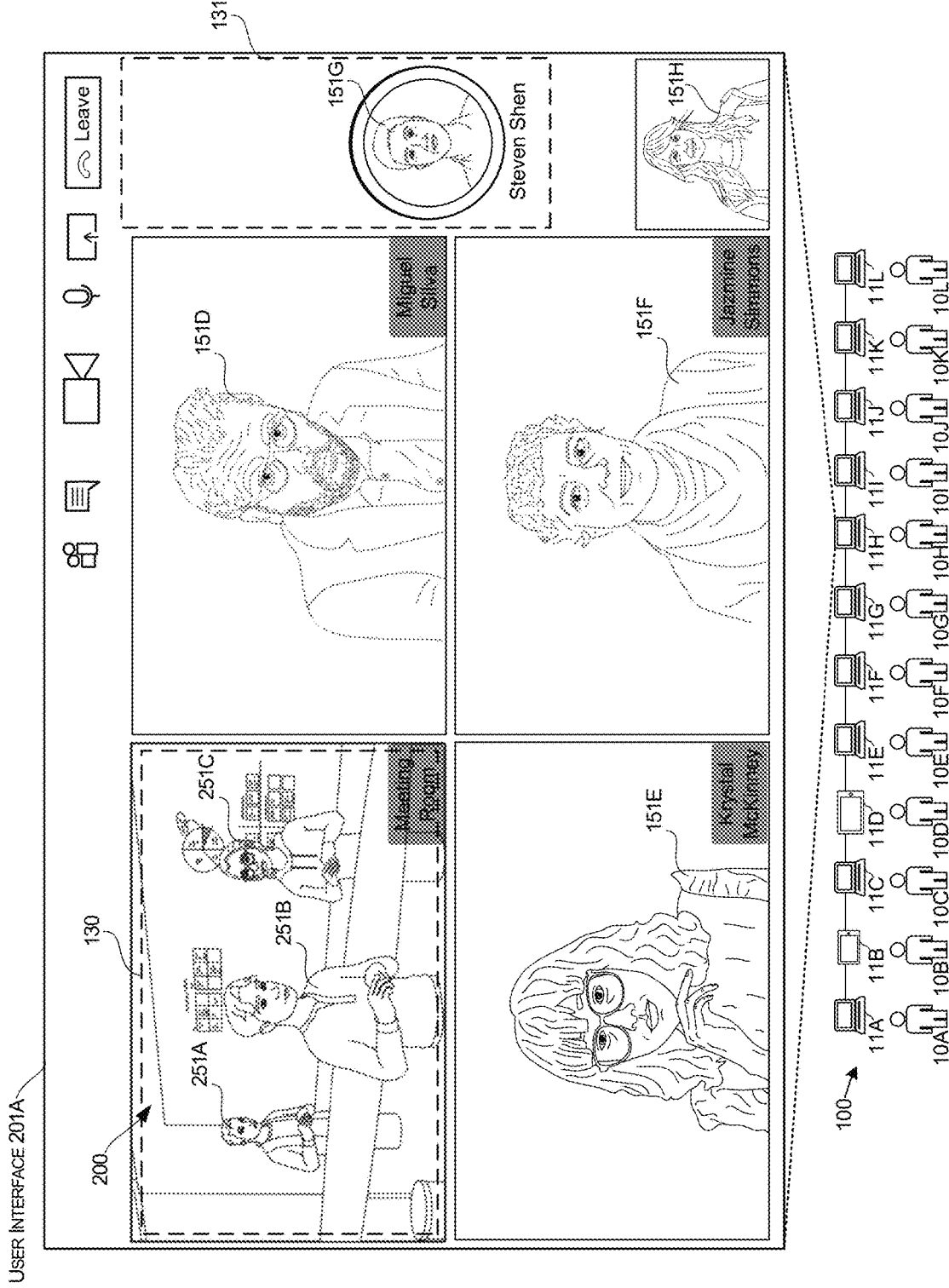
FIG. 2A illustrates a first user interface arrangement showing a plurality of users, where a first set of users are displayed as 3D representations and a second set of users are displayed as 2D images positioned with a designated region reserved for active speakers.
Figure 2B:
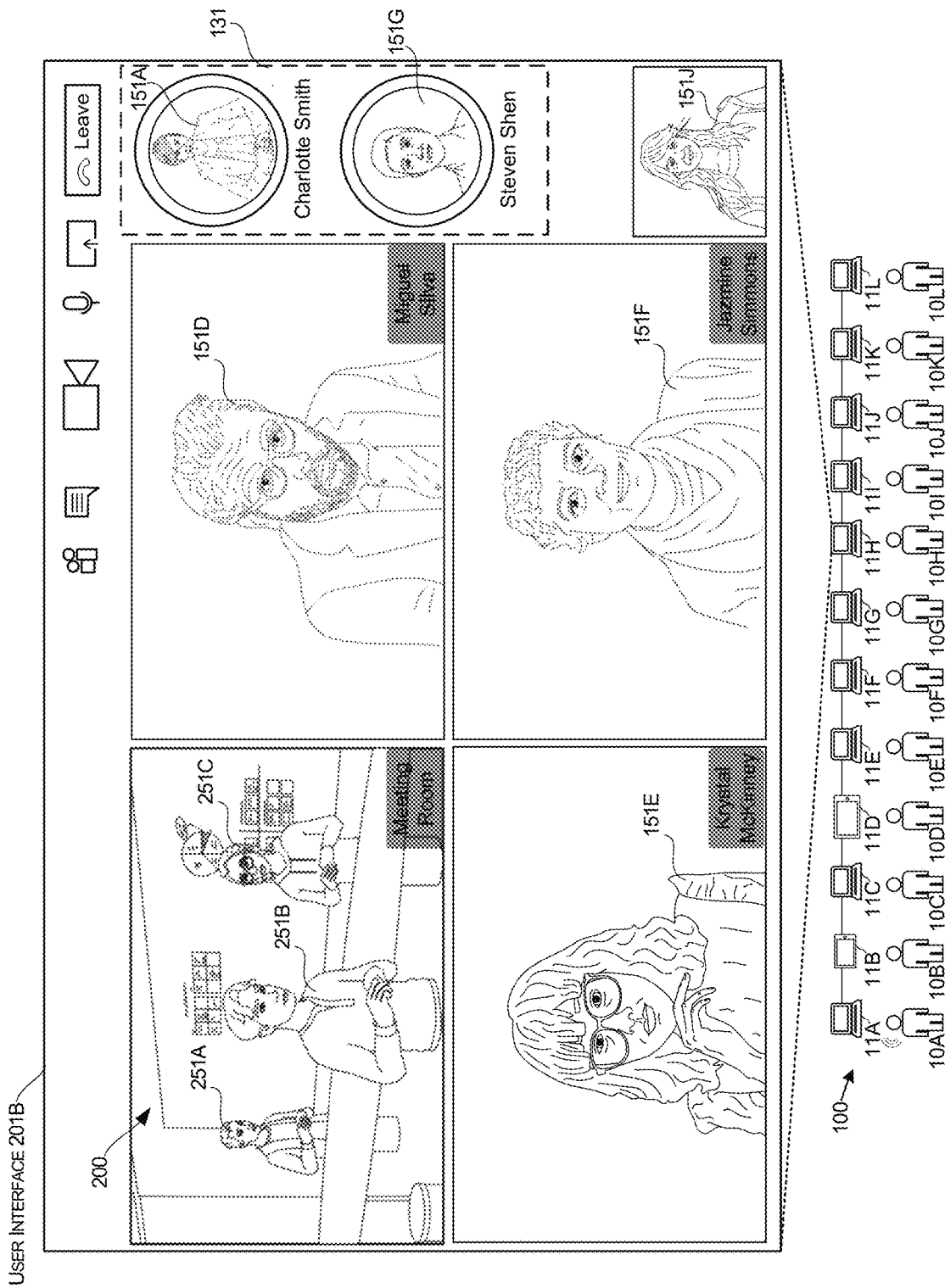
FIG. 2B illustrates a second user interface arrangement that provides a visual indicator to bring user focus to an active speaker of the first set of users displayed as 3D renderings, where the visual indicator is an image of the active speaker displayed in a designated region positioned in an overflow area of the user interface.

FIGS. 2A-2B illustrates another example of a user interface transition that may occur when a triggering input is received. For illustrative purposes, a triggering input can include any type of speech input that meets one or more criteria described herein. A triggering input can include any type of user input that causes a 3D representation to perform a gesture that gives the appearance that the 3D representation is speaking. A triggering input can include any type of user input that communicates any content to another users, including but not limited to text messages, instant messages, group chat messages, etc.

This example is similar to the above-described example in that the first user 10A provides a speech input or another qualifying input, and in response to that input, a second image of that user is displayed within a second region 131 reserved for active speakers. In the example of FIG. 2A, the second region 131 reserved for active speakers is positioned in association with an overflow queue. The overflow queue may be an area of the UI that displays renderings of users who are not qualified, e.g., ranked high enough, to be displayed in the grid of 2D renderings. The overflow queue, also referred to herein as the supplemental queue, can be generated when the speaker queue for the grid renderings has reach a maximum limit of users. For instance, if the speaker queue for the grid section of a UI has a limit of three users, and there are four active speakers, the system will display the top three users in the grid of images and display the fourth ranked speaker in the overflow queue.

As shown in FIG. 2A, the first user interface arrangement 201A shows a rendering of a 3D representation of the first user 10A displayed within a rendering of a 3D environment. When the first user 10A starts to provide a speech input or any other qualifying input, e.g., one that controls the 3D representation to give an appearance that the user is speaking, the system then displays a supplemental image 151A of that user within the second region 131, as shown in FIG. 2B.

In some configurations, the overflow queue can be reserved for users participating in a communication session that have computers that do not produce a video component. Thus, users participating as audio-only users can be pleased in the overflow queue shown in FIGS. 2A and 2B. Thus, the second region shown in FIG. 2A is to be distinguish from the second region shown in FIG. 1A. The second region shown in FIG. 1A can be reserved for active speakers that are using communication devices that can produce a video stream and an audio stream. This video stream can also include a rendering of a 3D avatar. The second region shown in FIG. 1A can be reserved for active speakers that are using communication devices that generate an audio stream without generating a video stream. The user interface can also include a graphical element, such as a ring around the audio-only user, that can change color, shape or size when the user depicted in the overflow queue, e.g., the second region 131 shown in FIG. 2A, speaks. This system can monitor the audio signal of each audio-only user and modify the graphical element when a threshold volume is detected.

Figure 3A:
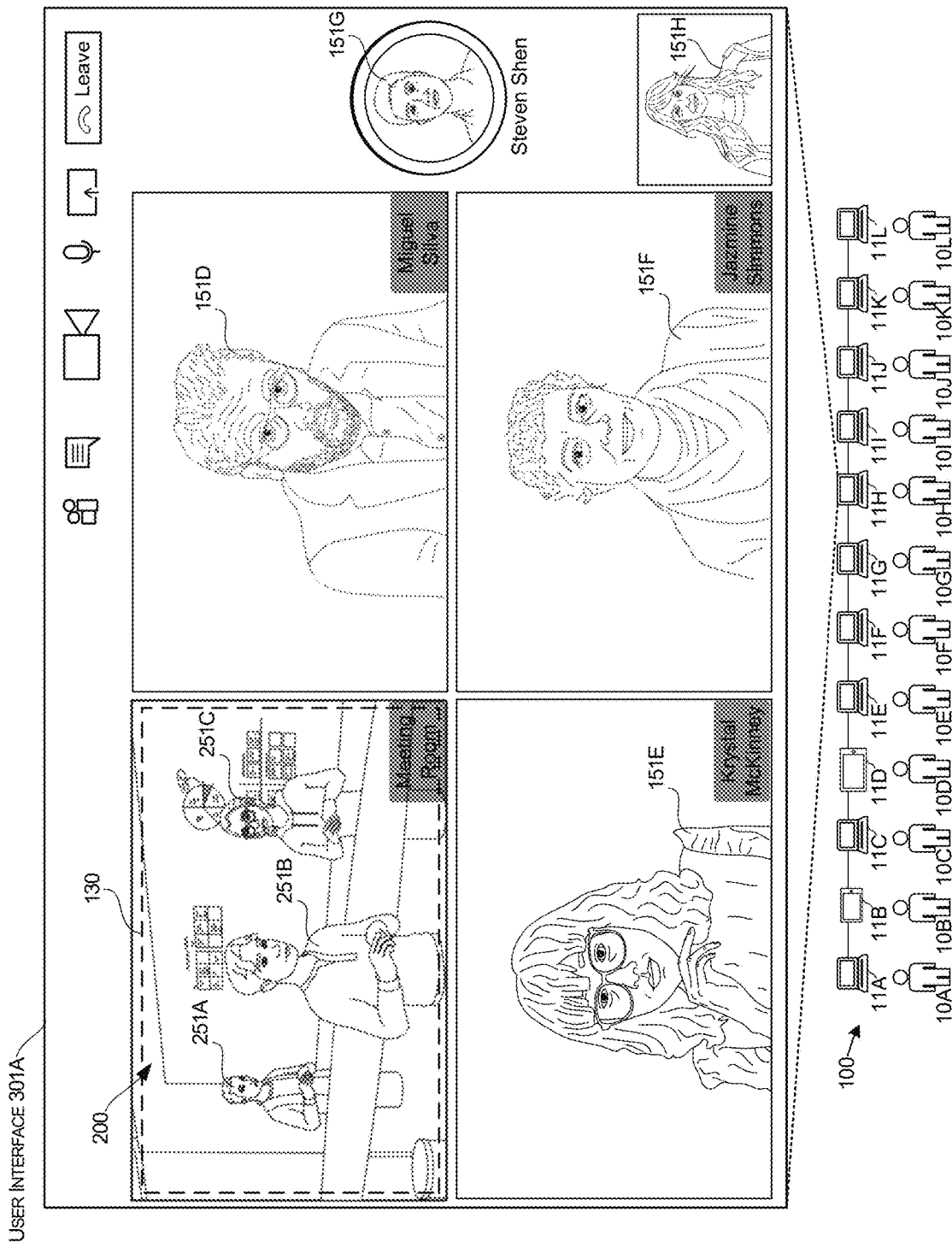
FIG. 3A illustrates a first user interface arrangement showing a plurality of users, where a first set of users are displayed as 3D representations and a second set of users are displayed as 2D images positioned with a designated region reserved for active speakers.
Figure 3B:
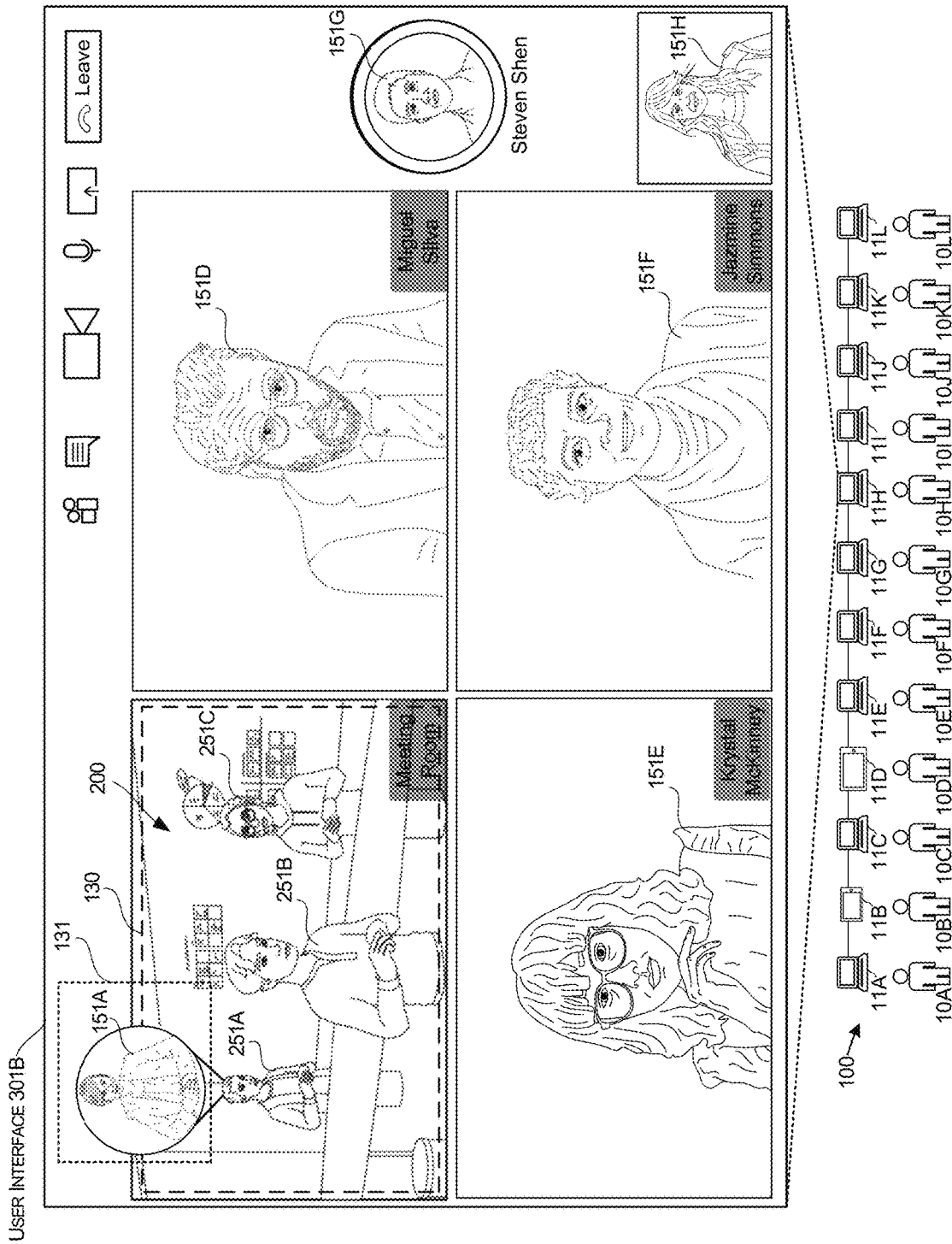
FIG. 3B illustrates a second user interface arrangement that provides a visual indicator to bring user focus to an active speaker of the first set of users displayed as 3D renderings, where the visual indicator is an image of the active speaker displayed in a designated region is at least partially arranged to overlap with a display of a 3D environment.

FIGS. 3A-3B illustrates another example of a user interface transition that may occur when a triggering input is received. This example is similar to the above-described example in that the first user 10A provides a triggering input, and in response to that triggering input, a second image of that user is displayed within a second region 131 reserved for active speakers. In this embodiment, the second region 131 reserved for active speakers is positioned and arranged to overlap, at least partially, with the 3D rendering of the 3D environment 200. In other words, in this embodiment the first region 130, which is reserved for a rendering of 3D representations of users positioned within a 3D environment 200, and the second region 131 are arranged to, at least partially, overlap.

As shown in FIG. 3A, the first user interface arrangement 301A shows a rendering of a 3D representation of the first user 10A displayed within a rendering of a 3D environment. When the first user 10A starts to provide a speech input or any other input that controls the 3D representation to give an appearance that the user is speaking, as shown in FIG. 3B, the system then displays, the second UI arrangement 301B, a supplemental image 151A of that user within the second region 131.

Figure 4B:
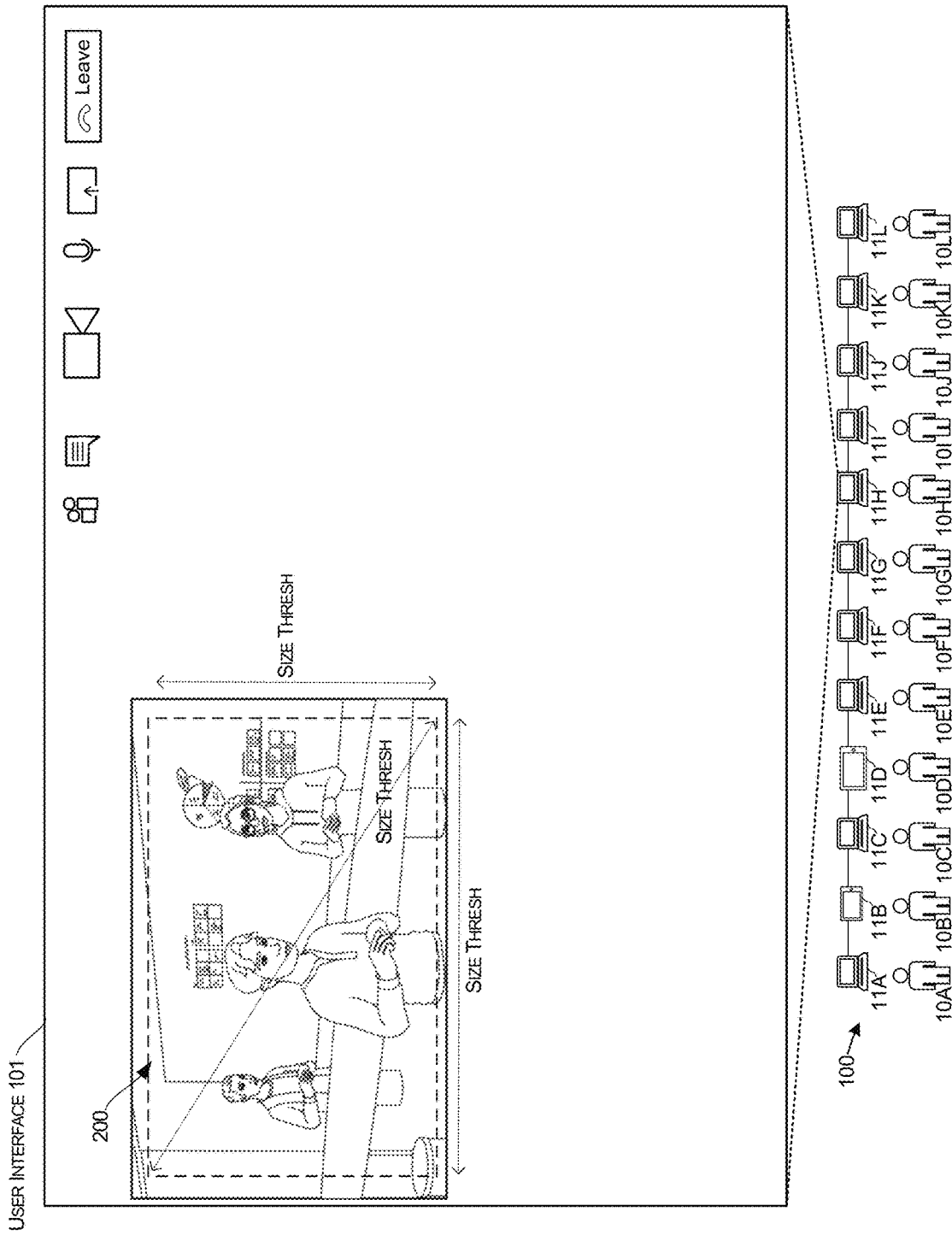
FIG. 4B illustrates a scenario where a size threshold of a rendering of a 3D environment can be used to change permissions to deny the display of a visual indicator of an active speaker.

FIGS. 4A and 4B illustrates aspects of a system that can control the user interface transitions described herein. In some configurations, the user interface transition can be controlled by one of our factors, such as the size of a 3D rendering of the 3D environment 200. This control can be utilized to preserve computing resources in situations that a transition is more likely needed. For instance, if the 3D rendering of the 3D environment 200 is relatively small within a user interface, the system can caused the transition described herein to help users identify active speakers within a 3D environment. The display of a notification of an active speaker may be necessary in a scenario where the rendering of the 3D environment is relatively small and it is difficult for users to see actual movement of the 3D avatars 251.

In some embodiments, if a rendering of a 3D environment 200 has one or more dimensions that is smaller than a threshold dimension, the system may set permissions to allow the transitions described herein. This example is shown in FIG. 4A, where at least the one dimension of the rendering of the 3D environment 200 is smaller than a threshold size or threshold dimension. However, as shown in the example of FIG. 4B, at least one dimension of the rendering of the 3D environment 200 is larger than a threshold size or a threshold dimension. When this condition is detected, the system can set permissions to deny the UI transitions described herein, e.g., the system can restrict the display of a graphical notification of an active speaker having a 3D representation positioned in a 3D environment. This allows a system to preserve resources by restricting user interface transitions, e.g., the display of notifications of active speakers, in scenarios where the transition is less likely to be needed.

FIG. 5 illustrates additional technical details on the UI renderings disclosed herein. In some embodiments, when an input is received for causing the UI transitions described herein, the system can determine a location and orientation for a virtual camera 350 used for controlling a viewing perspective for the 3D representation of an active speaker. For instance, in the example shown in FIG. 1A, when the first user 10, who is displayed as a 3D representation within a 3D environment, provides a triggering input, such as a speech input that meets one or more criteria, the system can modify a location or orientation of a virtual camera 350 so that the rendering of the 3D environment provides in more direct view of the face of the user's 3D representation.

For example, as shown in FIG. 6A, prior to a triggering input, consider a scenario where the position and the orientation of a virtual camera 350 is configured such that the 3D representation 251A for the first user 10A is facing away from the virtual camera. In this scenario, viewers of a 3D representation 251A for the first user 10A may not be able to see when the user is speaking because they would be unable to see the facial gestures based on the camera angle. Thus, in response to a triggering input, in addition to providing a supplemental image 151A, as shown in FIG. 6B, the system can modify the position and orientation of the virtual camera such that the rendering of the 3D environment also shows the face of the 3D representation for the first user. This modification of the orientation and/or the location of the virtual camera can be modified such that viewers of the 3D environment 200 would be able to see the face of the active speaker's avatar. This modification of the virtual camera can provide further notification to viewers of active speakers. In addition, the movement of the orientation or the location of the virtual camera can be initiated in response to any of the triggering inputs described herein.

Returning now to FIG. 5, additional aspects of a system configured to implement the techniques disclosed herein is shown and described below. For illustrative purposes, a rendering of a 2D image file or a rendering of a 2D image of a user can be generated by a 2D rendering engine 551 receiving 2D image data 310, e.g., an image file. A rendering of a 2D image file can include a 2D environment, e.g., the background of an image, and a 2D object, e.g., an image of a person or an avatar. The image file, e.g., image data 310, can have pixels arranged in two dimensions, e.g., pixels arranged within a two-dimensional coordinate system (x, y). This data can also be referred to herein as a two-dimensional model that is based on a two-dimensional coordinate system. Each part of an image can be a pixel or any other geometric shape, such as a triangle. For instance, a group of pixels or triangles can be used to generate a rendering of a two-dimensional avatar of a user, or a live video image of a person.

A two-dimensional environment having a number of 2D images of participants of a communication session is also referred to herein as a "grid environment." Image data or a communication data stream can define a two-dimensional environment or a two-dimensional object, and that two-dimensional environment can be rendered on a display screen. The rendering can be referred to herein as a two-dimensional rendering of a two-dimensional environment or a two-dimensional rendering of a two-dimensional object. This is also referred to herein as a "rendering of the two-dimensional image."

For illustrative purposes, a rendering of a 3D model or a rendering of a 3D representation of the user can be generated by a 3D rendering engine 552 accessing 3D model data 320, e.g., a 3D model. A 3D model can include parameters defining a 3D environment 200, e.g., a model of a room, and parameters defining 3D objects, e.g., size, shape, and position data for representations 351 of users or other virtual objects. A three-dimensional environment is a computing environment model that is based on a three-dimensional coordinate system. Attributes of the three-dimensional environment and three-dimensional objects in the three-dimensional environment are based on components that are positioned within a three-dimensional coordinate system (x, y, z). Each component can be a triangle or any other geometric shape. Each of the components can have a position, e.g., a location in the three-dimensional coordinate system, as well as an orientation, e.g., a direction in which a triangle is pointed. For instance, a group of triangles can be used to generate a rendering of a three-dimensional avatar of a user or a three-dimensional rendering of a three-dimensional object.

A three-dimensional environment is also referred to herein as an "immersive environment." Model data or a three-dimensional model can be included in a communication data stream and the model data can define a three-dimensional environment. That three-dimensional environment can be based on a three-dimensional coordinate system. When the rendering engine 552 generates a 3D rendering from a 3D model, that rendering is generated from a reference point in the environment, e.g., a perspective having a position relative to the virtual environment. for illustrative purposes, a reference point is also referred to herein as a virtual camera 350. That camera can have a field of view which is used to generate a rendering of a 3D environment or a 3D object based on the position of the virtual camera 350. The rendering of a three-dimensional object in the three-dimensional environment is based on a position and orientation of the three-dimensional object and the position of the virtual camera 350.

In some embodiments, two-dimensional images can be displayed within a three-dimensional environment. This can occur, for instance, when a communication system receives a two-dimensional video stream of a user, but participants receiving that video stream are viewing a 3D environment with HMDs. This may cause the system to show the image of that user on as if they are appearing on a virtual television on the wall of the virtual environment. This is referred to herein as a two-dimensional rendering of a user within a three-dimensional environment. This can include the third user 10C shown in FIG. 2A as a rendering 151C.

In some embodiments, a three-dimensional environment and three-dimensional objects defined by a three-dimensional model can be displayed as a two-dimensional rendering. This can occur, for instance, when a communication session involves a user interface that shows two-dimensional images, e.g., when Teams is in Grid Mode. While in this mode, the system may need to display images of users interacting in a 3D environment. In this instance, a 2D image of the 3D environment is displayed from a particular position, e.g., a virtual camera position, and that 2D image is displayed within one of the grids. This rendering can be referred to herein as a two-dimensional rendering of a three-dimensional environment. To achieve a two-dimensional rendering of a three-dimensional environment, model data defining a three-dimensional environment can be projected using a transform. The transform can generate the rendering such that the width, height, and depth of a three-dimensional object can be expressed on a flat screen using vector projections from a model of the object to a point of view, e.g., a virtual camera position.

Figure 7:
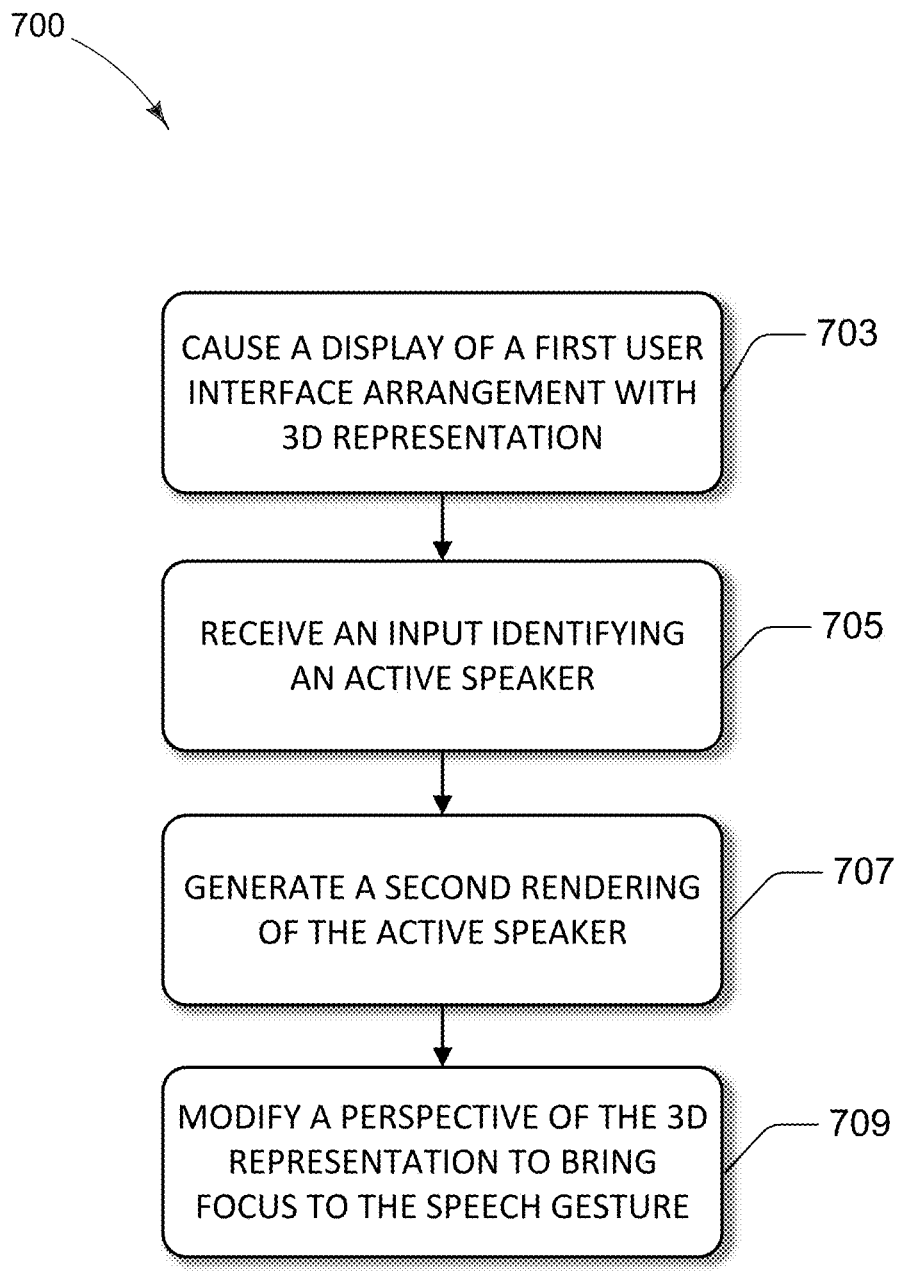
FIG. 7 is a flow diagram showing aspects of a routine for controlling the display of visual indicators to show active speakers of a communication session who are displayed as 3D representations.

FIG. 7 is a diagram illustrating aspects of a routine 700 for providing automation of visual indicators showing active speakers of 3D representations of users participating in communication sessions. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 703 where the system causes a display of a first user interface arrangement with 3D representation. An example of the first user interface arrangement is shown in FIG. 1A. The first user interface arrangement can include a rendering of a 3D environment 200 with a number of three-dimensional representations of users participating in a communication session. Each of the three-dimensional representations have an independent position and orientation within the three-dimensional environment that are each controlled by an input provided by an associated user of the plurality of users. The first user interface arrangement can also include regions each reserved for different types of renderings. For instance, a first region is reserved for the 3D environment, and a second region is reserved for renderings of active speakers.

At operation 705, the system receives an input identifying an active speaker. This operation can include the use of one or more modules for monitoring audio streams received from computing devices of users participating in the communication session. When one of the audio streams includes a user's speech, and that speech meets one or more criteria, the system can initiate one or more actions to transition the user interface arrangement.

Operation 705 may also include determining that the user (10A) is a member (251A) of the users (10) being rendered in 3D representations (251). The system may determine that the user is a member of the users being rendered as 3D representations by a data structure that associates user identities with individuals depicted in a 3D environment 200. Any Meeting participant that as identified as a user that is displayed as a 3D representation in a 3D environment is a member of users identified in this data structure. Thus, the system can update this data structure each time a user is rendered as a 3D representation in the 3D environment. In addition, this system can update the data structure to remove a user identity when the user is no longer displayed as a 3D representation in the 3D environment. In some embodiments, the system can then make any disclosed operation, including operation 707, responsive to the system determining that a user, such as the first user (10A), is identified as being a member of the users being rendered as 3D representations (251). Thus, in such embodiments, this system may restrict the execution of an operation, including operation 707, if the system determines that a user is not a member of the users being rendered as 3D representations (251).

At operation 707, where the system generates a second rendering of the active speaker in response to an input that meets one or more criteria. The generation of the second rendering can include operations for transitioning the first user interface arrangement shown in FIG. 1A to the second user interface arrangement shown in FIG. 1B. Similar transitions can be made, such as the transition from the first user interface arrangement shown in FIG. 2A to the second user interface arrangement shown in FIG. 2B, and the transition from the first user interface arrangement shown in FIG. 3A to the second user interface arrangement shown in FIG. 3B.

In operation 707, the system may control the user interface transitions based on a size of a rendering of the 3D environment. For instance, if a rendering of a 3D environment is less than a threshold size, the system may allow one or more computing devices to perform the user interface transitions described herein. The system may restrict one or more computing devices from performing the user interface transitions described herein when the rendering of a 3D environment is greater than a threshold size.

In another embodiment, if a rendering of a 3D environment occupies less than a predetermined percentage of a display area of a device, e.g., a device screen, the system may allow one or more computing devices to perform the user interface transitions described herein. The system may restrict one or more computing devices from performing the user interface transitions described herein when the rendering of a 3D environment occupies more than a threshold percentage of a display area of a device.

In some embodiments, the system prevents the transition of the first user interface arrangement to the second user interface arrangement if the title or the role of the user do not meet one or more criteria. In addition, the system allows the transition of the first user interface arrangement to the second user interface arrangement if the title or the role of the user meet one or more criteria. For example, if person's level in an organization, a performance level of a person, or any other status information of a person meets one or more thresholds, the system may allow one or more computing devices to perform the user interface transitions described herein. The system may restrict one or more computing devices from performing the user interface transitions described herein if person's level in an organization, a performance level of a person, or any other status information of a person does not meet one or more thresholds, such as a performance threshold, ranking threshold, etc. For instance, the system may allow the UI transition, e.g., a generate a notification of an active 3D speaker, for a CEO but may not allow a UI transition for a person at another level. In another example, the system may provide a notification, e.g., execute a UI transition, of a view of an active speaker who has met sales numbers in an organization but the system may not provide a notification of an active speaker for a person who has not met sales numbers in the organization.

In operation 707, in some embodiments, the second user interface arrangement comprises a first region reserved for a rendering of the three-dimensional environment and a second region reserved for renderings of active speakers of the communication session. The second region is in a grid format having individual sections for each user rendering, such as the individual renderings 151 shown FIG. 1A. The transition of the first user interface arrangement to the second user interface arrangement includes adding a new grid section for the second rendering of the user. Thus, all other active speakers of the second region that were depicted prior to the transition will remain in the user interface throughout the transition.

In some embodiments, the generation of the second rendering can include generating a new user interface, e.g., a new window, that is independently controlled by the user. This enables the user to view the second rendering of the active speaker in the window that can be resized, moved, or closed in response to an input of the viewing user. This window can be in any position and size relative to the rendering of the 3D environment.

In operation 709, the system may also modify a perspective of the 3D representation of the active speaker to bring focus to the user's activity. As shown in FIGS. 6A and 6B, a virtual camera 350 used for determining a viewing perspective of a 3D environment may not always be directed towards the face of an avatar. When a user provides an input that causes the avatar to perform speech gestures, the system can change the camera position and orientation to allow the virtual camera to capture the speech gesture of an avatar. In addition to generating a supplemental rendering of a user in the user interface transition, this modification of the virtual camera angle can bring further focus to the user's activity.

The system can remove the second rendering of the user interface in response to the determining the input no longer meets the one or more criteria. For instance, if a user does not speak for a predetermined period of time, the system may remove the 2D image of the user and revert back to only showing the 3D rendering of the user. Removal of the second rendering can also occur when a person's position within a queue or ranking drops below one or more thresholds, e.g., another user becomes ranked higher, etc.

In some environments, the system can also trigger a transition of the user interface based on other signals other than a detection of a voice input. For example, if the system determines that a rendering of a 3D representation of a user is too small, e.g., that the 3D rendering is smaller than the threshold size, the system may automatically display a second 2D rendering of that user. In some configurations, the system may also display a second additional 2D rendering of a user if the person is speaking and their 3D rendering is also smaller than a threshold size. Thus, the size of the 3D rendering may function as a filter for predetermined users who are talking. Thus, if a person has a 3D representation that is larger than a threshold size and that user's speech meets one more criteria, that user may not be displayed in a second 2D rendering. However, if that person has a 3D representation that is smaller than the threshold size and that user's speech meets one more criteria, that user may be displayed in a second 2D rendering.

In addition, after a user has been displayed as a second additional 2D image in response to detecting that the user's voice speech input meets one of our criteria, the system may also increase that 2D image if the user speaks for more than a predetermined period of time or if the user's presentation contains more than a threshold number of words, phrases, etc. Thus, after a user interface transition, a 2D image of a user can increase to a full screen or at least be enlarged, in response to the user's speech input meeting a second set of criteria, e.g., the user speaks longer than a second threshold of time or uses more than a second threshold of words or phrases.

The following clauses further the present disclosure.

Clause A: A method for generating a visual indicator for distinguishing an active speaker from of users (10) of a communication session (604) displayed as 3D representations (251), the method configured for execution on a system, the method comprising: causing a display of a first user interface arrangement (101A) comprising individual renderings of three-dimensional representations (251) of a plurality of users (10) participating in the communication session, wherein each of the three-dimensional representations (251) have an independent position and orientation within the three-dimensional environment (200) that are each controlled by a control input provided by an associated user of the plurality of users (10), the first user interface arrangement (101A) further comprising renderings of a subset of users (151D-151F) in a 2D format, the renderings of the subset of users are generated by from 2D devices (11D-11F) associated the subset of users (151D-151F); receiving an input identifying a user (10A) as the active speaker from the plurality of users (10), wherein the user (10A) is identified as the active speaker by a detection of a speech input received by a microphone associated with the user (10A) generating an audio stream received for the communication session; determining the user (10A) being a member (251A) of the users (10) being rendered in 3D representations (251); responsive to the user (10A) being identified as the active speaker and being the member of the users being rendered in 3D representations (251), causing a transition of the first user interface arrangement (101A) to a second user interface arrangement (101B) comprising the three-dimensional representations (251) of the plurality of users including the user and a second, additional rendering (151A) of the user (10A) in a 2D format, wherein: the first user interface arrangement (101A) does not concurrently display a 3D representation (251A) of the user (10A) and the second additional rendering (151A) of the user (10A) in the 2D format, and the second user interface arrangement (101B) concurrently displays the second, additional rendering (151A) of the user (10A) and the 3D representation (251A) of the user (10A) positioned within the three-dimensional environment (200).

Clause B: The method of any of the Clauses: wherein the second user interface arrangement comprises a first region reserved for a rendering of the three-dimensional environment and a second region reserved for renderings of active speakers of the communication session, the second region comprising 2D renderings of video streams of users qualifying as active speakers, wherein the second rendering of the user (10A) is displayed within, at least in part, the second region.

Clause C: The method of any of the Clauses, wherein the second user interface arrangement comprises a first region reserved for a rendering of the three-dimensional environment and a second region reserved for renderings of active speakers that qualify for a overflow queue of users that is secondary to a primary queue of users, wherein the second rendering of the user (10A) is displayed within, at least in part, the second region.

Clause D: The method of any of the Clauses, wherein the second user interface arrangement comprises a first region reserved for a rendering of the three-dimensional environment and a second region reserved for renderings of active speakers of the communication session, the second region is, at least partially, overlapping with the first region, wherein the second rendering of the user (10A) is displayed within, at least in part, the second region.

Clause E: The method of any of the Clauses, wherein the system controls the transition of the first user interface arrangement to the second user interface arrangement based on a size of a rendering of the three-dimensional environment, wherein the system prevents the transition of the first user interface arrangement to the second user interface arrangement when the size of the rendering of the three-dimensional environment is less than a size threshold, wherein the system allows the transition of the first user interface arrangement to the second user interface arrangement when the size of the rendering of the three-dimensional environment is greater than the size threshold.

Clause F: The method of any of the Clauses, wherein the system controls the transition of the first user interface arrangement to the second user interface arrangement based on a title or role of the user, wherein the system prevents the transition of the first user interface arrangement to the second user interface arrangement if the title or the role of the user do not meet one or more criteria, wherein the system allows the transition of the first user interface arrangement to the second user interface arrangement if the title or the role of the user meet one or more criteria.

Clause G: The method of any of the Clauses, second user interface arrangement comprises a first region reserved for a rendering of the three-dimensional environment and a second region reserved for renderings of active speakers of the communication session, wherein the second region is in a grid format having individual sections for each user rendering, wherein the transition of the first user interface arrangement to the second user interface arrangement includes adding a new grid section for the second rendering of the user.

Figure 8:
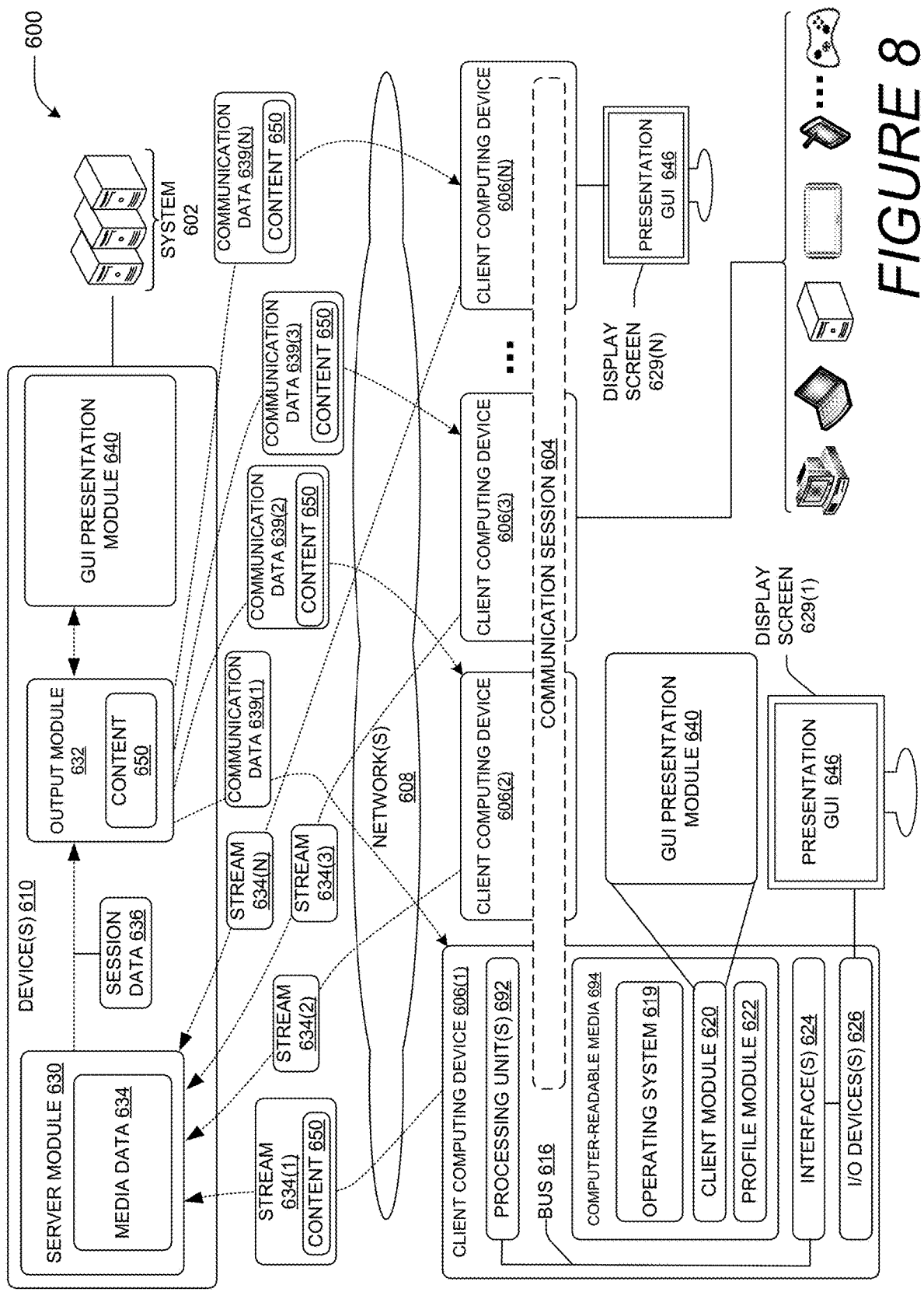
FIG. 8 is a computer architecture diagram illustrating an illustrative computer hardware and software architecture for a computing system capable of implementing aspects of the techniques and technologies presented herein.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
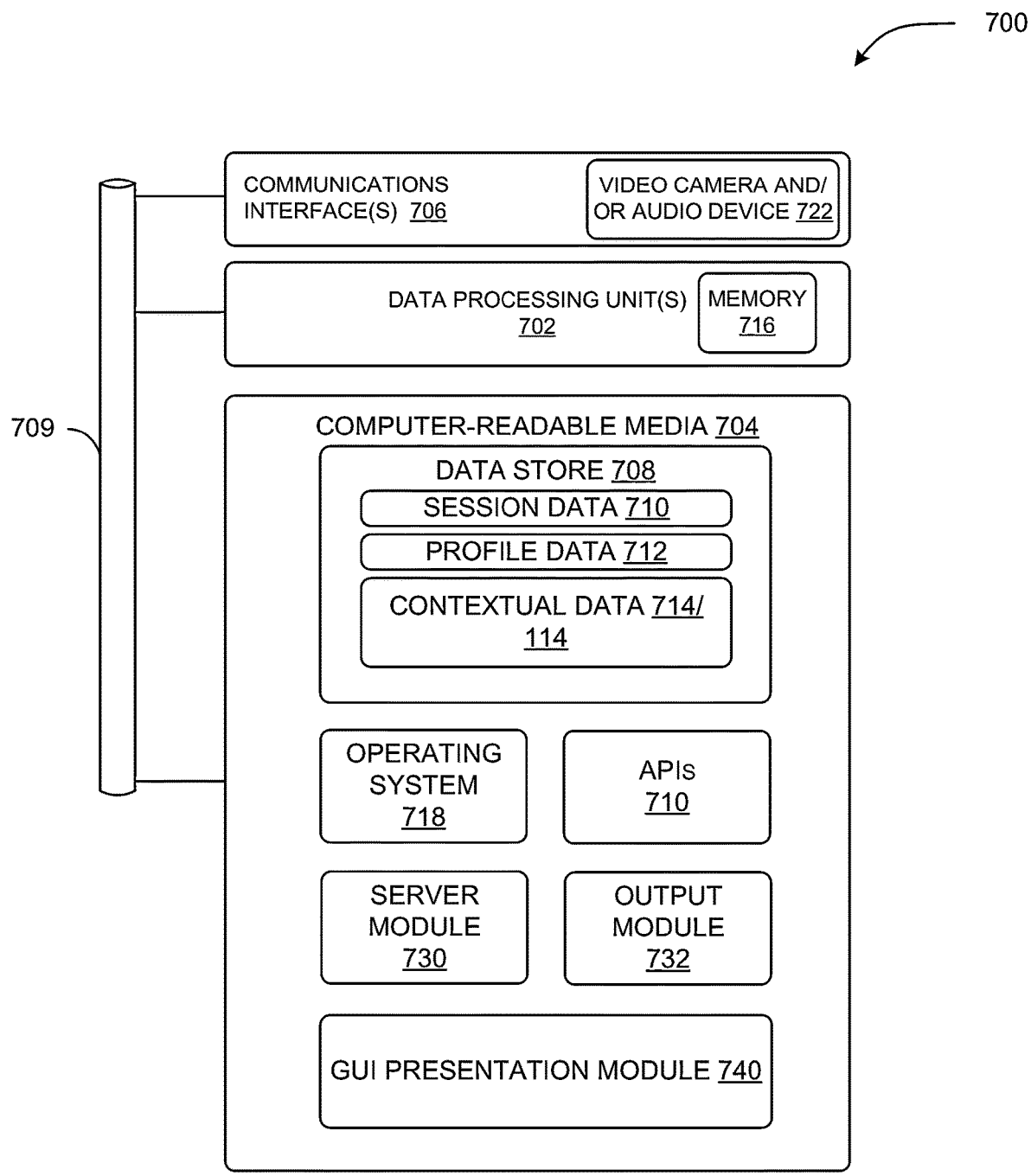
FIG. 9 is a computer architecture diagram illustrating a computing device architecture for a computing device capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method for generating a visual indicator for distinguishing an active speaker from other users of a communication session displayed as three-dimensional virtual reality representations, the method configured for execution on a system, the method comprising:

causing a display of a first user interface arrangement comprising individual renderings of three-dimensional virtual reality representations of a plurality of users participating in the communication session, wherein each of the three-dimensional virtual reality representations have an independent position and orientation within the three-dimensional virtual reality environment that are each controlled by a control input provided by an associated user of the plurality of users, the first user interface arrangement further comprising renderings of images of individual users of a subset of users in a 2D live video stream format, the renderings of the images of the individual users of the subset of users are generated by one or more cameras capturing images of the subset of users;

receiving an audio input identifying a user as the active speaker from the plurality of users, wherein the user is identified as the active speaker by a detection of a speech input received by a microphone associated with the user generating the audio input received for the communication session, the audio input for invoking a transition of the first user interface arrangement comprising a three-dimensional virtual reality representation of the active speaker without a 2D live video stream of the active speaker to a second user interface comprising the three-dimensional virtual reality representation of the active speaker concurrently with the 2D live video stream of the active speaker;

determining the user identified as the active speaker while being a member of the users being rendered in the three-dimensional virtual reality representations and wherein the active speaker is not displayed in the 2D live video stream format in the first user interface arrangement;

responsive to the user being identified as the active speaker while being the member of the users being rendered in the three-dimensional virtual reality representations and wherein the active speaker is not displayed in the 2D live video stream format in the first user interface arrangement, causing a transition of the first user interface arrangement to a second user interface arrangement comprising the three-dimensional virtual reality representations of the plurality of users including the user and a second additional rendering of an image of the user in a 2D live video stream format generated by a camera directed toward the user, wherein:

the first user interface arrangement does not concurrently display a three-dimensional virtual reality representation of the user and the second additional rendering of the image of the user in the 2D live video stream format, and the second user interface arrangement concurrently displays the second additional rendering of the image of the user in the 2D live video stream format and the three-dimensional virtual reality representation of the user that does not include the image of the user generated by the camera directed toward the user or one or more representations of the user, the three-dimensional virtual reality representation of the user positioned within the three-dimensional virtual reality environment generated from a three-dimensional model.

2. The method of claim 1, wherein the second user interface arrangement comprises a first region reserved for a rendering of the three-dimensional virtual reality environment and a second region reserved for renderings of active speakers of the communication session, the second region comprising 2D renderings of live video streams of users qualifying as active speakers, wherein the second rendering of the user is displayed within, at least in part, the second region.

3. The method of claim 1, wherein the second user interface arrangement comprises a first region reserved for a rendering of the three-dimensional virtual reality environment and a second region reserved for renderings of active speakers that qualify for an overflow queue of users that is secondary to a primary queue of users, wherein the second rendering of the user is displayed within, at least in part, the second region.

4. The method of claim 1, wherein the second user interface arrangement comprises a first region reserved for a rendering of the three-dimensional virtual reality environment and a second region reserved for renderings of active speakers of the communication session, the second region is, at least partially, overlapping with the first region, wherein the second rendering of the user is displayed within, at least in part, the second region.

5. The method of claim 1, wherein the system controls the transition of the first user interface arrangement to the second user interface arrangement based on a size of a rendering of the three-dimensional virtual reality environment, wherein the system prevents the transition of the first user interface arrangement to the second user interface arrangement when the size of the rendering of the three-dimensional virtual reality environment is less than a size threshold, wherein the system allows the transition of the first user interface arrangement to the second user interface arrangement when the size of the rendering of the three-dimensional virtual reality environment is greater than the size threshold.

6. The method of claim 1, wherein the system controls the transition of the first user interface arrangement to the second user interface arrangement based on a title or role of the user, wherein the system prevents the transition of the first user interface arrangement to the second user interface arrangement if the title or the role of the user do not meet one or more criteria, wherein the system allows the transition of the first user interface arrangement to the second user interface arrangement if the title or the role of the user meet one or more criteria.

7. The method of claim 1, second user interface arrangement comprises a first region reserved for a rendering of the three-dimensional virtual reality environment and a second region reserved for renderings of active speakers of the communication session, wherein the second region is in a grid format having individual sections for each user rendering, wherein the transition of the first user interface arrangement to the second user interface arrangement includes adding a new grid section for the second rendering of the user.

8. The method of claim 1, wherein the transition of the first user interface arrangement to a second user interface arrangement is not invoked when a 2D rendered user depicted in the 2D live video stream is determined to be the active speaker.

9. The method of claim 1, wherein the three-dimensional virtual reality representations include representations of the plurality of users, wherein the transition of the first user interface arrangement to a second user interface arrangement includes:
selecting the virtual reality representation of the user from the other virtual reality representations of the other users based on the input identifying the user as the active speaker, and
generating the rendering of the image of the user in the 2D live video stream format generated by the camera directed toward the user, the image of the user in the 2D live video stream supplementing the virtual reality representation of the user.

10. The method of claim 1, wherein the single input does not include a control input for moving the three-dimensional virtual reality representation of the active speaker from a first location to a second location.

11. A system for generating a visual indicator for distinguishing an active speaker from other users of a communication session displayed as three-dimensional virtual reality representations, the system comprising:
one or more processing units; and
a computer-readable storage medium having encoded thereon computer-executable instructions to cause the one or more processing units to:
cause a display of a first user interface arrangement comprising individual renderings of three-dimensional virtual reality representations of a plurality of users participating in a communication session, wherein each of the three-dimensional virtual reality representations have an independent position and orientation within the three-dimensional virtual reality environment that are each controlled by a control input provided by an associated user of the plurality of users, the first user interface arrangement further comprising renderings of images of individual users of a subset of users in a 2D live video stream format, the renderings of the images of the individual users of the subset of users are generated by one or more cameras capturing images of the subset of users;
receive an audio input identifying a user as the active speaker from the plurality of users, wherein the user is identified as the active speaker by a detection of a speech input received by a microphone associated with the user generating the audio input received for the communication session, the audio input for invoking a transition of the first user interface arrangement comprising a three-dimensional virtual reality representation of the active speaker without a 2D live video stream of the active speaker to a second user interface comprising the three-dimensional virtual reality representation of the active speaker concurrently with the 2D live video stream of the active speaker;
determining the user being a member of the users while being rendered in three-dimensional virtual reality representations and wherein the active speaker is not displayed in the 2D live video stream format in the first user interface arrangement;
responsive to the user being identified as the active speaker while being the member of the users being rendered in three-dimensional virtual reality representations and wherein the active speaker is not displayed in the 2D live video stream format in the first user interface arrangement, causing a transition of the first user interface arrangement to a second user interface arrangement comprising the three-dimensional virtual reality representations of the plurality of users including the user and a second, additional rendering of an image of the user in a 2D live video stream format generated by a camera directed toward the user, wherein:

the first user interface arrangement does not concurrently display a three-dimensional virtual reality representation of the user and the second additional rendering of the image of the user in the 2D live video stream format, and the second user interface arrangement concurrently displays the second additional rendering of the image of the user and a three-dimensional virtual reality representation of the user, that does not include the image of the user generated by the camera directed toward the user, the three-dimensional virtual reality representation of the user positioned within the three-dimensional virtual reality environment, wherein the second rendering of the second user interface arrangement is the visual indicator for distinguishing the user as the active speaker from other the users of the communication session displayed as three-dimensional virtual reality representations generated from a 3D model.

12. The system of claim 11, wherein the second user interface arrangement comprises a first region reserved for a rendering of the three-dimensional virtual reality environment and a second region reserved for renderings of active speakers of the communication session, the second region comprising 2D renderings of video streams of users qualifying as active speakers, wherein the second rendering of the user is displayed within, at least in part, the second region.

13. The system of claim 11, wherein the second user interface arrangement comprises a first region reserved for a rendering of the three-dimensional virtual reality environment and a second region reserved for renderings of active speakers of the communication session, the second region is, at least partially, overlapping with the first region, wherein the second rendering of the user is displayed within, at least in part, the second region.

14. The system of claim 11, wherein the system controls the transition of the first user interface arrangement to the second user interface arrangement based on a size of a rendering of the three-dimensional virtual reality environment, wherein the system prevents the transition of the first user interface arrangement to the second user interface arrangement when the size of the rendering of the three-dimensional virtual reality environment is less than a size threshold, wherein the system allows the transition of the first user interface arrangement to the second user interface arrangement when the size of the rendering of the three-dimensional virtual reality environment is greater than the size threshold.

15. The system of claim 11, wherein the system controls the transition of the first user interface arrangement to the second user interface arrangement based on a title or role of the user, wherein the system prevents the transition of the first user interface arrangement to the second user interface arrangement if the title or the role of the user do not meet one or more criteria, wherein the system allows the transition of the first user interface arrangement to the second user interface arrangement if the title or the role of the user meet one or more criteria.

16. The system of claim 11, second user interface arrangement comprises a first region reserved for a rendering of the three-dimensional virtual reality environment and a second region reserved for renderings of active speakers of the communication session, wherein the second region is in a grid format having individual sections for each user rendering, wherein the transition of the first user interface arrangement to the second user interface arrangement includes adding a new grid section for the second rendering of the user.

17. A computer-readable storage medium having encoded thereon computer-executable instructions to cause one or more processing units of a system for generating a visual indicator for distinguishing an active speaker from other users of a communication session displayed as three-dimensional virtual reality representations, the method comprising:

cause a display of a first user interface arrangement comprising individual renderings of three-dimensional virtual reality representations of a plurality of users participating in a communication session, wherein each of the three-dimensional virtual reality representations have an independent position and orientation within the three-dimensional virtual reality environment that are each controlled by a control input provided by an associated user of the plurality of users, the first user interface arrangement further comprising renderings of images of individual users of a subset of users in a 2D live video stream format, the renderings of the images of the individual users of the subset of users are generated by one or more cameras capturing images of the subset of users;

receive an audio input identifying a user as the active speaker from the plurality of users, wherein the user is identified as the active speaker by a detection of a speech input received by a microphone associated with the user generating the audio input received for the communication session, the audio input for invoking a transition of the first user interface arrangement comprising a three-dimensional virtual reality representation of the active speaker without a 2D live video stream of the active speaker to a second user interface comprising the three-dimensional virtual reality representation of the active speaker concurrently with the 2D live video stream of the active speaker;

determining the user being a member of the users while being rendered in three-dimensional virtual reality representations and wherein the active speaker is not displayed in the 2D live video stream format in the first user interface arrangement;

responsive to the user being identified as the active speaker and being the member of the users being rendered in three-dimensional virtual reality representations and wherein the active speaker is not displayed in the 2D live video stream format in the first user interface arrangement, causing a transition of the first user interface arrangement to a second user interface arrangement comprising the three-dimensional virtual reality representations of the plurality of users including the user and a second, additional rendering of an image of the user in a 2D live video stream format, wherein:

the first user interface arrangement does not concurrently display a three-dimensional virtual reality representation of the user and the second additional rendering of the image of the user in the 2D live video stream format, and the second user interface arrangement concurrently displays the second additional rendering of the image of the user and a three-dimensional virtual reality representation of the user that does not include the image of the user generated by the camera directed toward the user or one or more representations of the user, the three-dimensional virtual reality representation of the user positioned within the three-dimensional virtual reality environment, wherein the second rendering of the second user interface arrangement is the visual indicator for distinguishing the user as the active speaker from other the users of the communication session displayed as three-dimensional virtual reality representations generated from a 3D model.

18. The computer-readable storage medium of claim 17, wherein the second user interface arrangement comprises a first region reserved for a rendering of the three-dimensional virtual reality environment and a second region reserved for renderings of active speakers of the communication session, the second region is, at least partially, overlapping with the first region, wherein the second rendering of the user is displayed within, at least in part, the second region.

19. The computer-readable storage medium of claim 17, wherein the system controls the transition of the first user interface arrangement to the second user interface arrangement based on a size of a rendering of the three-dimensional virtual reality environment, wherein the system prevents the transition of the first user interface arrangement to the second user interface arrangement when the size of the rendering of the three-dimensional virtual reality environment is less than a size threshold, wherein the system allows the transition of the first user interface arrangement to the second user interface arrangement when the size of the rendering of the three-dimensional virtual reality environment is greater than the size threshold.

20. The computer-readable storage medium of claim 17, wherein the system controls the transition of the first user interface arrangement to the second user interface arrangement based on a title or role of the user, wherein the system prevents the transition of the first user interface arrangement to the second user interface arrangement if the title or the role of the user do not meet one or more criteria, wherein the system allows the transition of the first user interface arrangement to the second user interface arrangement if the title or the role of the user meet one or more criteria.

\* \* \* \* \*